(12) United States Patent
Dakis (10) Patent No.: US 9,204,752 B2
(45) Date of Patent: Dec. 8, 2015

(54) MULTI-LAYER BREWING CUP

(71) Applicant: Louis Dakis, Clifton, NJ (US)

(72) Inventor: Louis Dakis, Clifton, NJ (US)

(*) Notice: Subject to any disclaimer, the term of this patent is extended or adjusted under 35 U.S.C. 154(b) by 0 days.

(21) Appl. No.: 14/322,086

(22) Filed: Jul. 2, 2014

(65) Prior Publication Data

US 2014/0311354 A1  Oct. 23, 2014

Related U.S. Application Data (62) Division of application No. 13/572,831, filed on Aug. 13, 2012, now Pat. No. 8,808,778.

(60) Provisional application No. 61/655,579, filed on Jun. 5, 2012.

(51) Int. Cl.
```
A47J 31/44    (2006.01)
A47J 31/40    (2006.01)
B65B 1/04     (2006.01)
B65B 29/02    (2006.01)
B65B 1/36     (2006.01)
```

(52) U.S. Cl.
CPC ............ *A47J 31/4403* (2013.01); *A47J 31/404* (2013.01); *B65B 1/04* (2013.01); *B65B 1/366* (2013.01); *B65B 29/02* (2013.01)

(58) Field of Classification Search
CPC ............................ B65D 21/02; B65D 21/0233
USPC ................. 99/323, 302 R; 206/515; 220/380
See application file for complete search history.

(56) References Cited

U.S. PATENT DOCUMENTS

| | | | | |
|---|---|---|---|---|
| 3,365,092 A | * | 1/1968 | Blessing | 220/23.88 |
| 4,340,138 A | * | 7/1982 | Bernhardt | 206/216 |
| 4,348,421 A | * | 9/1982 | Sakakibara et al. | 426/394 |
| 5,906,279 A | * | 5/1999 | Bergholtz et al. | 206/515 |
| 6,475,270 B1 | * | 11/2002 | Graeve | 96/135 |
| 2012/0318697 A1 | * | 12/2012 | Stern | 206/514 |
| 2013/0140211 A1 | * | 6/2013 | Robbins et al. | 206/517 |

* cited by examiner

*Primary Examiner* — Anthony Weier
(74) *Attorney, Agent, or Firm* — Michael J. Feigin, Esq.; Feigin & Associates, LLC (57) ABSTRACT

In an embodiment of the described technology, a multi-chamber cup is used to brew coffee or other (hot) drink in a brewing machine. Such a device allows one to add any coffee, but use all the features of an automated single-cup or multi-cup brewing machine. The multi-chamber cup has an inner cup, an intermediate cup, and an outer cup each having sides with circular cross-sections between a top side and bottom side, defining an inner cavity there-between, each with a lip at a top side of the respective cup, extending outwards from a respective inner cavity of each cup. This allows water to enter and flow through multiple cups (at least three) before exiting the multi-chamber cup, such that the liquid becomes homogenized with dissolved particulate solid matter to produce a flavorful, high-quality drink.

9 Claims, 11 Drawing Sheets

MULTI-LAYER BREWING CUP

FIELD OF THE DISCLOSED TECHNOLOGY

The disclosed technology relates generally to food and beverage apparatuses and, more specifically, to a brewing cup for single cup brewing.

BACKGROUND OF THE DISCLOSED TECHNOLOGY

Automatic brewing machines for single cups of coffee or tea are known in the art. For example, U.S. Pat. No. 6,658,989, assigned to Keurig, Incorporated, discloses a single serving beverage brewer in which a measured charge of dry beverage medium is infused with a metered amount of heated liquid. This reference is herein incorporated by reference, in its entirety. A reusable beverage filter cartridge, with a cup-shaped housing having a top opening and bottom outlet port, an internal filter, and a removable lid, is used.

The drawback to such machines is that one typically must buy relatively expensive pre-packaged cups, each cup wrapped in a container to be disposed of, creating a lot of waste. While this is more convenient than brewing an entire pot of coffee for just one drink, and produces a much better-tasting drink than instant coffee which is added to hot water, a user typically cannot choose his/her preferred quantity of ground coffee, or add any coffee grounds of his/her choice. If one did so with an automatic single cup brewing machine, the results would be unreliable.

Therefore, there is a need in the art to provide the convenience of single-cup coffee brewing machines, but with less waste, and with the low cost and flexibility of traditional multi-cup coffee makers.

SUMMARY OF THE DISCLOSED TECHNOLOGY

Therefore, it is an object of the disclosed technology to find an efficient way to use ground coffee, and other particulate solids to produce drinks which are most flavorful.

As such, in an embodiment of the disclosed technology, a multi-chamber cup is used to brew coffee or other (hot) drinks in a brewing machine. Such a device allows one to add any coffee, but use all the features of an automated single-cup brewing machine. The multi-chamber cup has an inner cup, an intermediate cup, and an outer cup, each having sides with circular cross-sections between a top side and bottom side, defining an inner cavity there-between, each with a lip at a top side of the respective cup, extending outwards from a respective inner cavity of each cup. This allows water to enter and flow through multiple cups (at least three) before exiting the multi-chamber cup, such that the liquid becomes homogenized with dissolved particulate solid matter to produce a flavorful, high-quality drink.

The lip of the intermediate cup, in an embodiment, has a stepped bifurcation between an inner portion of said lip closer to the cavity of the intermediate cup, and an outer portion of the lip further from the cavity of the intermediate cup. That is, the lip is in two parts with a lower inner part and raised outer part, to fit within a larger cup without moving, as well as house a smaller cup without it moving. The inner cup is adapted to fit within the cavity of the intermediate cup, such that a bottom side of the lip of the inner cup abuts a top side of the inner portion of the lip of the intermediate cup. The intermediate cup is further adapted to fit within the cavity of the outer cup, such that a top side of the outer portion of the lip of the intermediate cup abuts a bottom side of the lip of the outer cup.

The lip of the outer cup may have two portions: a) a first portion being wider and/or extending further down towards a bottom side of the outer cup than a b) second portion. The lid may have a partial-circumferential lower lip, which may further correspond to the second portion of the lip of the outer cup, "correspond" being defined as covering opposite portions of an edge of the same imaginary circle. Thus, the lip of the lid and first portion of the lip, or entire lip, of the outer cup may be joined together to form a complete circumferential lip.

The lid may be generally circular (having a circular top and circular bottom) where "generally," for purposes of this disclosure, is defined as "what an ordinary observer would consider as such" or "at least 75% being as such." Thus, when the bottom of the lid is called "generally circular," even though it may have a lip around the edge, it is still considered to be "generally circular," and even though the top may have ridges, it is still considered "generally circular." The lid may further have a portal at a midpoint of the circular shape.

The cups may also have portals on their sides or bottoms, in addition to the top portal opening into the cavity of the cups, the top portal being surrounded by a lip. The inner cup may have side portals, the side portals closer to the bottom side than top side. The intermediate cup may have side portals closer to the top side. Both the intermediate cup and the outer cup may further have bottom portals.

In a stacked configuration, in an embodiment of the disclosed technology, the inner cup is in the intermediate cup, and the intermediate cup in the outer cup, and the stacked cups (defined as a majority of one cup residing within a cavity of another cup) are adapted to house solid particulate matter in the inner cup. As such, liquid entering through the portal of the lid/cover is forced (defined as, having a path via which it will flow, due to the force of gravity on the cup when the lid is towards a direction opposite the force of gravity, and the bottom is aligned towards the direction of the force of gravity) to flow through each cup before exiting out a bottom of the outer cup.

In a method of using a cup, such a cup has at least three layers of cups, each having bottoms, sides, and openings into cavities of each cup at the top. The method is carried out, not necessarily in this order, by a) placing an inner cup into an intermediate cup such that a lip of the inner cup rests on an inner portion of a lip of the intermediate cup, b) placing the intermediate cup into an outer cup such that an outer portion of the lip of the intermediate cup rests on a lip of the outer cup, c) placing particulate solid material in a cavity of the inner cup, and d) placing the inner, intermediate, and outer cups in a chamber of a brewing apparatus, the brewing apparatus having a heating chamber and liquid dispensing mechanism.

Further, one may cause a lid to slide over at least one inner, intermediate, and/or outer cup. Liquid from the brewing apparatus may enter through the lid onto the particulate solid matter. The inner cup may have side portals closer to the bottom than the top, such that the liquid is then forced to exit through the side portals into the intermediate cup, which may have side portals, such as closer to the bottom than the top of the cup where the liquid then exits through to the outer cup. The outer cup may have bottom portals on the bottom side of the outer cup, and at least some of the liquid may exit through the bottom portals into an apparatus external to the three layers of cups. At least one cup of the inner, intermediate, and outer cups may have exterior ridges adapted to align with ridges of another cup.

The lid may have a central portal adapted for passage there-through of liquid. The lid may further have a partially-circumferential lip adapted to abut a corresponding partial-circumferential portion of a lip of the outer cup. In a stacked condition with lid covering the cups such that the lips of the outer cup and lid form a complete circular lip, the inner and the intermediate cups are hidden from view, in an embodiment of the disclosed technology.

It should be understood that the use of "and/or" is defined inclusively such that the term "a and/or b" should be read to include the sets: "a and b," "a or b," "a," "b."

Further features of the device, described above, are also applicable to a method of use.

DETAILED DESCRIPTION OF EMBODIMENTS OF THE DISCLOSED TECHNOLOGY

In an embodiment of the disclosed technology, a multi-chamber cup is used to brew coffee or other (hot) drinks in a single or multi-cup brewing machine. Such a device allows one to add any coffee of one's choice, but use all the features of an automated single-cup brewing machine. The multi-chamber cup has an inner cup, an intermediate cup, and an outer cup, each having sides with circular cross-sections between a top side and bottom side, defining an inner cavity there-between, each with a lip at a top side of the respective cup, extending outwards from a respective inner cavity of each cup. This allows water to enter and flow through multiple cups (at least three) before exiting the multi-chamber cup, such that the liquid becomes homogenized with dissolved particulate solid matter to produce a flavorful, high-quality drink.

Embodiments of the disclosed technology will become clearer in view of the following description of the drawings.

Figure 1:
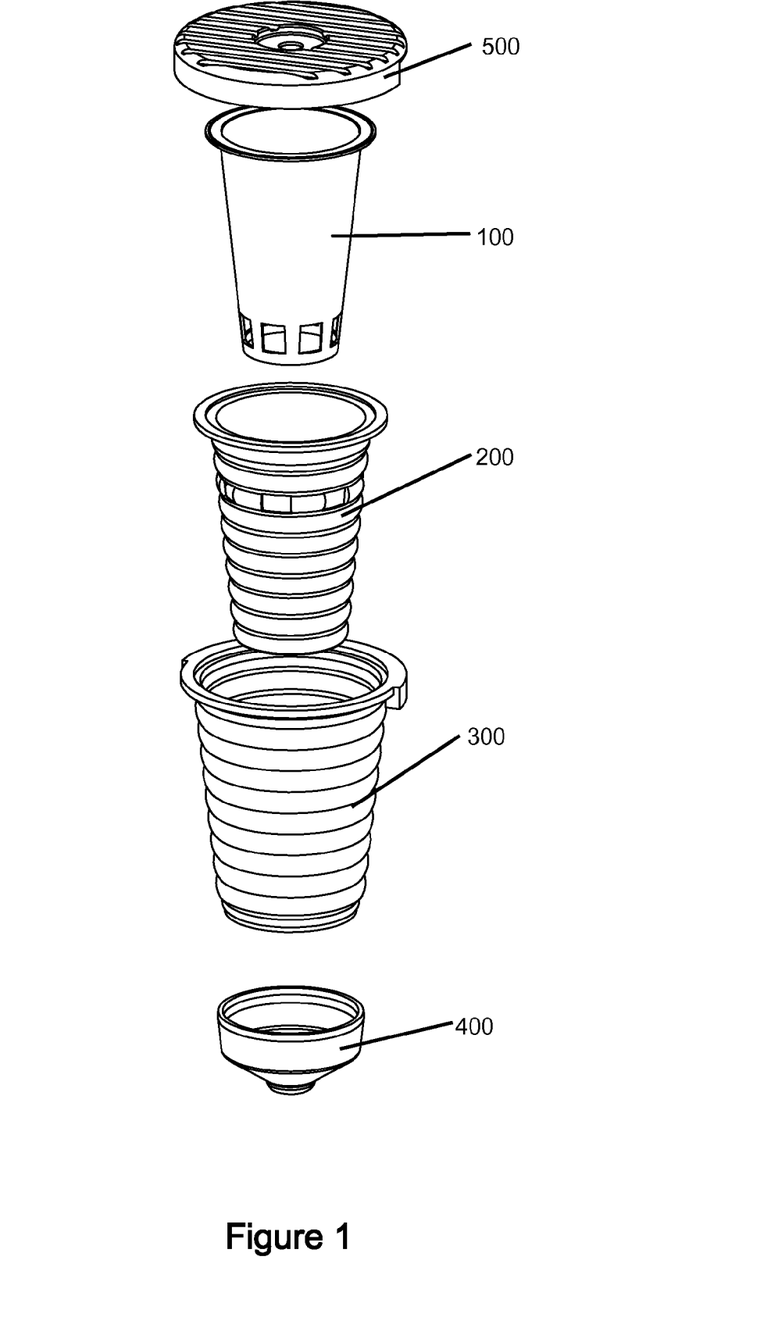
FIG. 1 shows a blown apart view of a brewing cup of an embodiment of the disclosed technology.

FIG. 1 shows a blown apart view of a brewing cup of an embodiment of the disclosed technology. Each piece, from most interior to exterior, is numbered in increments of 100. The inner lining layer of the brewing cup 100 fits into the intermediate layer cup 200, such that the lip of cup 100 rests on the lip of cup 200. The intermediate layer cup 200 fits within the outer layer cup 300, such that the lip of cup 200 rests on the lip of cup 300. Outer layer cup 300 fits onto the lower nozzle 400, the nozzle 400 being adaptable to fit within a particular automated single or multi-cup brewing machine. The lid 500 is slidable over cups 100, 200, and 300. A half-lip, extending 180 degrees or less than fully around the top opening of the lid 500 is adapted to be engaged with the corresponding half lip or less than full lip of outer cup 300. In this manner, the lid is slidable on and off, allowing for automating the covering and/or uncovering when used with a brewing machine or adapter for a brewing machine.

Figure 2A:
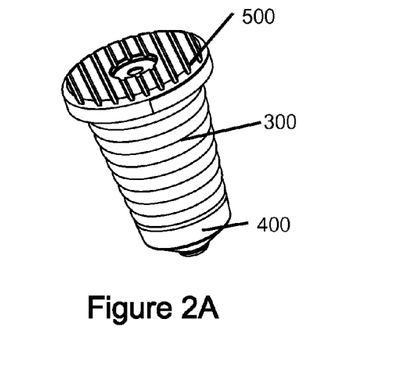
FIG. 2A shows a top perspective view of a brewing cup of an embodiment of the disclosed technology.
Figure 2B:
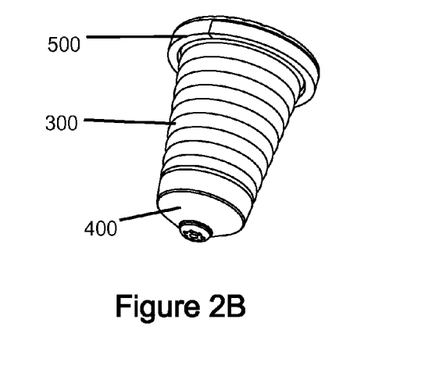
FIG. 2B shows a reverse perspective view of the brewing cup of FIG. 2A.
Figure 2C:
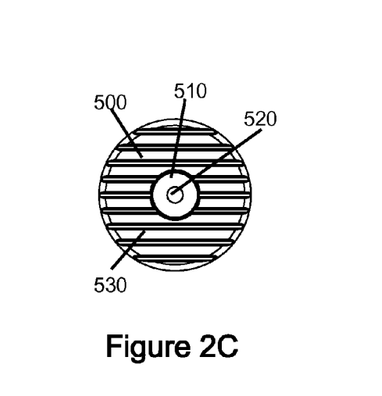
FIG. 2C shows a top view of the brewing cup of FIGS. 2A and 2B.
Figure 2D:
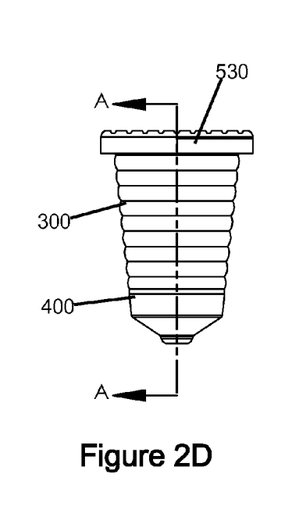
FIG. 2D shows a side view of the brewing cup of FIGS. 2A-2C.
Figure 2E:
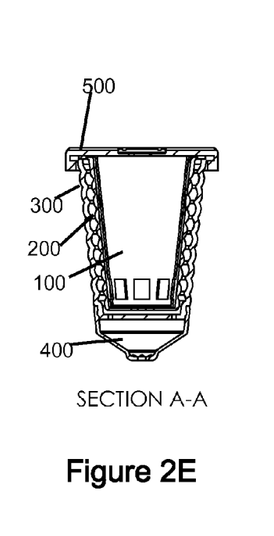
FIG. 2E shows a cutaway view along section line A-A of FIG. 2D.
Figure 2F:
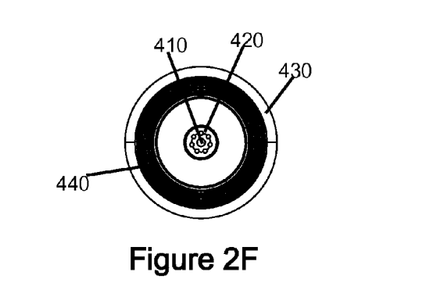
FIG. 2F shows a bottom view of the brewing cup of FIGS. 2A-2E.

FIG. 2A shows a top perspective view of a brewing cup of an embodiment of the disclosed technology. FIG. 2B shows a reverse perspective view of the brewing cup of FIG. 2A. FIG. 2C shows a top view of the brewing cup of FIGS. 2A and 2B. FIG. 2D shows a side view of the brewing cup of FIGS. 2A-2C. FIG. 2E shows a cutaway view along section line A-A of FIG. 2D. FIG. 2F shows a bottom view of the brewing cup of FIGS. 2A-2E. As shown, the brewing cup is in a fully assembled condition. The lid 500 is over the outer cup layer 300, which is situated into the bottom nozzle piece 400. Liquid enters through the upper portal 520 of the lid, into the cavity of the inner cup 100, the inner up 100 also comprising coffee grounds, tea, or another particulate solid material, leaf, or flavor-adding compound which dissolves in, or partially exits with, the liquid.

While it will become clearer in view of the foregoing figures, in use, one puts the particulate solid matter or other matter, as described above, into the inner basket 100 before or after inserting the intermediate basket 200, which in turn, is placed, before or after, in the outer basket 300. The lid or cover 500 is slid in place over the top, and liquid, typically hot liquid, enters between the depressed region 520 of the lid 500 having a top side 530, through the portal 520, granted access to an inner cavity surrounded by the cups 100, 200 and 300. The liquid exits through lower portals of the inner cup 100, into the intermediate cup 200, whence it exits through upper portals and bottom portals of this cup, into the outer cup 300, and out through the nozzle piece 400. As seen in FIG. 2F in particular, the nozzle portion has sides 430 with a central region 420 which may be flat, this region further having bottom portals 410 through which the liquid exits, towards its final destination, typically a cup of a drinker, comprising (or about to comprise) the brewed drink.

Figure 3:
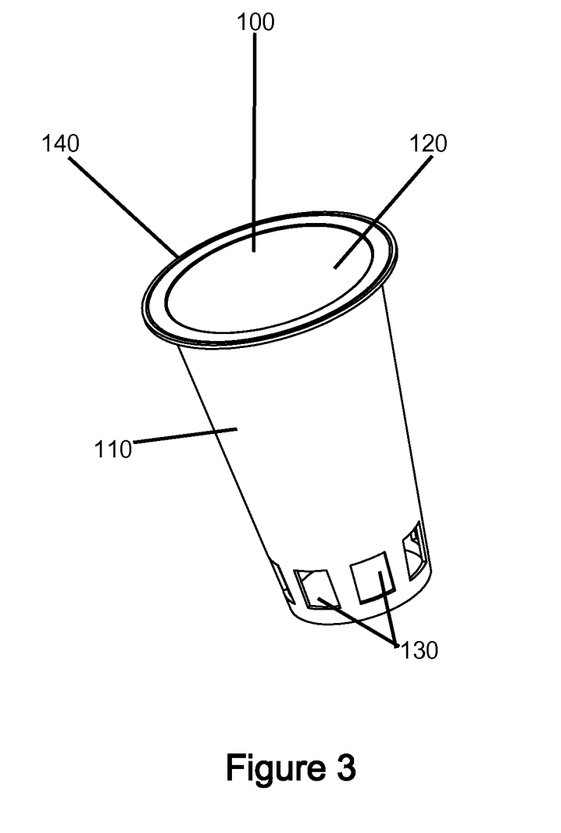
FIG. 3 shows a perspective view of an interior lining cup of an embodiment of the disclosed technology.

FIG. 3 shows a perspective view of an interior lining cup of an embodiment of the disclosed technology. This interior lining cup 100 has an exterior side 110 and interior side 120, the interior side forming a cavity for holding particulate solid matter (or the like, as described above). The portals 130 allow liquid, such as water, to exit there-through when this liquid enters through the top opening thereof and begins to fill the interior space defined by the interior side 120 of the cup. These portals extend around the circumference of the inner lining cup in a regular manner, in an embodiment of the disclosed technology. When in use, the inner lining cup 100 is housed within the intermediate cup 200, preventing the solid particulate matter from escaping through the portals in any non-negligible amount. A screen or filter is placed in the cavity of the inner lining cup, in an embodiment of the disclosed technology.

Figure 4A:
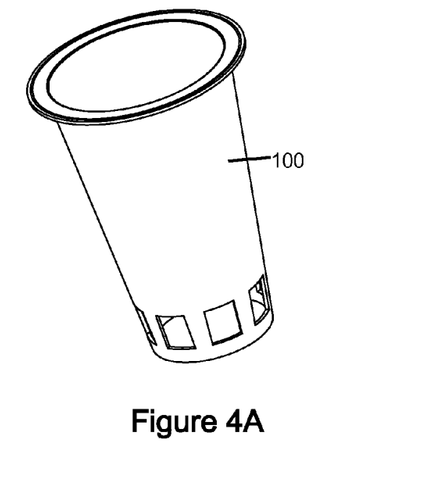
FIG. 4A shows another perspective view of the interior lining cup of FIG. 3.
Figure 4B:
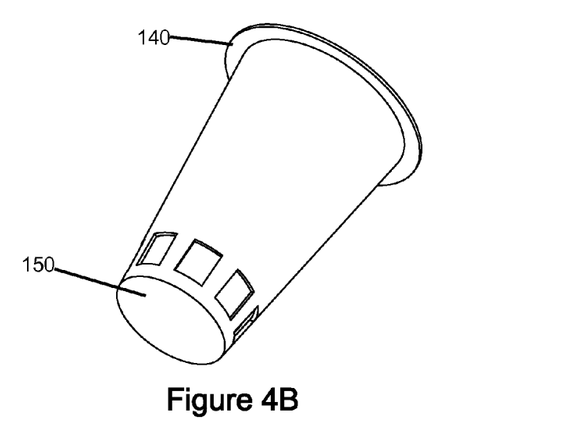
FIG. 4B shows a button perspective view of the interior lining cup of FIG. 3.
Figure 4C:
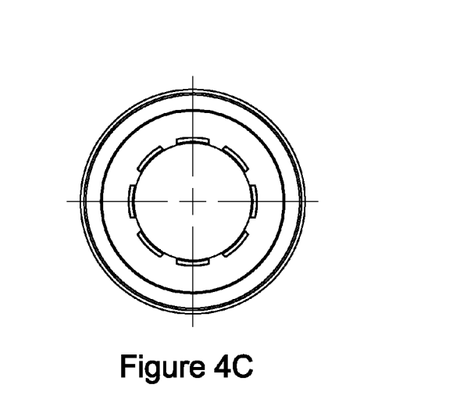
FIG. 4C shows a top plan view of the interior lining cup of FIG. 3.
Figure 4D:
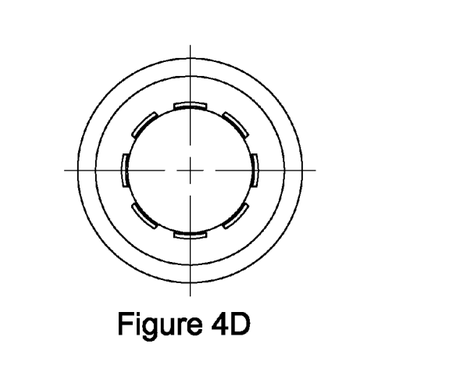
FIG. 4D shows a bottom plan view of the interior lining cup of FIG. 3.
Figure 4E:
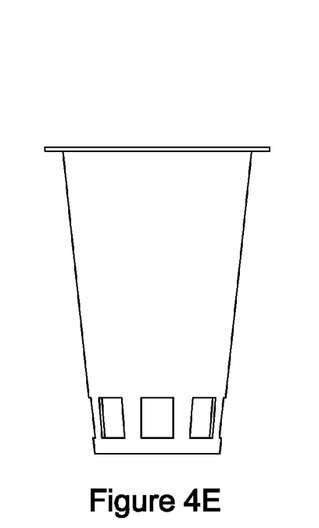
FIG. 4E shows a side view of the interior lining cup of FIG. 3.

FIG. 4A shows another perspective view of the interior lining cup of FIG. 3. FIG. 4B shows a bottom perspective view of the interior lining cup of FIG. 3. FIG. 4C shows a top plan view of the interior lining cup of FIG. 3. FIG. 4D shows a bottom plan view of the interior lining cup of FIG. 3. FIG. 4E shows a side view of the interior lining cup of FIG. 3. In these figures, it can be more readily ascertained that the lip 140 extends past the exterior side of the cup body. This lip 140 allows it to sit on (be abutted against) the intermediate cup. Note also that the portals 130 are in the lower region. For purposes of this disclosure, "bottom" refers to the bottom side of a cup, the bottom being in the direction of the pull of gravity. The "top" refers to the side where fluid is added, opposite the direction of gravity. "Lower side" or "lower portion" refers to the side of a cup, closest to the bottom and no more than starting 25% of the distance from the bottom. "Upper side" (or "upper portion") is the opposite of lower side, in that it refers to the side of a cup, closest to the top and no more than starting 25% of the distance from the top.

Figure 5:
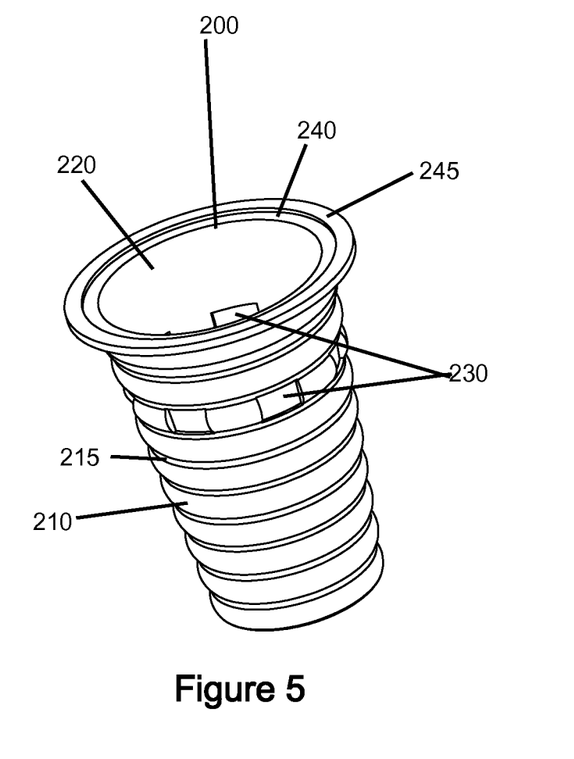
FIG. 5 shows a perspective view of an intermediate layer cup of an embodiment of the disclosed technology.

FIG. 5 shows a perspective view of an intermediate layer cup of an embodiment of the disclosed technology. Note that the intermediate layer cup 200 has an inner lip 240 and outer lip 245. An inner side 220 of the body of the cup forms a cavity there-between, with a large portal at the top. The inner lip 240 forms/is adjacent to the outermost region of the cavity and is circular/has a circular cross-section. The outer lip 245, at its smallest circumference, is larger than the largest circumference of the inner lip. The inner and outer lip abut each other and differ from each other by having different external heights at the top side of the cup 200, forming a step or bifurcation between the two portions of the lip, 240 and 245. As such, lip 240 is adapted to abut lip 140 of the inner cup, and lip 245 is adapted to abut lip 340 of cup 300.

Side portals 230 surround the circumference of the upper side of the cup, in the embodiment shown. At least one side portal is used, in embodiments, or a plurality thereof. The exterior of the cup 210 has ridges 215 which are adapted to fit between the interior ridges of the outer cup layer 300.

Figure 6A:
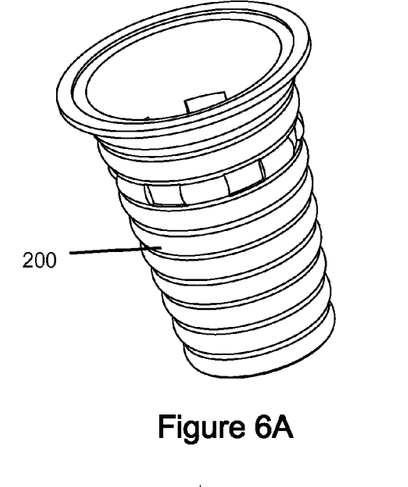
FIG. 6A shows another perspective view of the intermediate layer cup of FIG. 5.
Figure 6B:
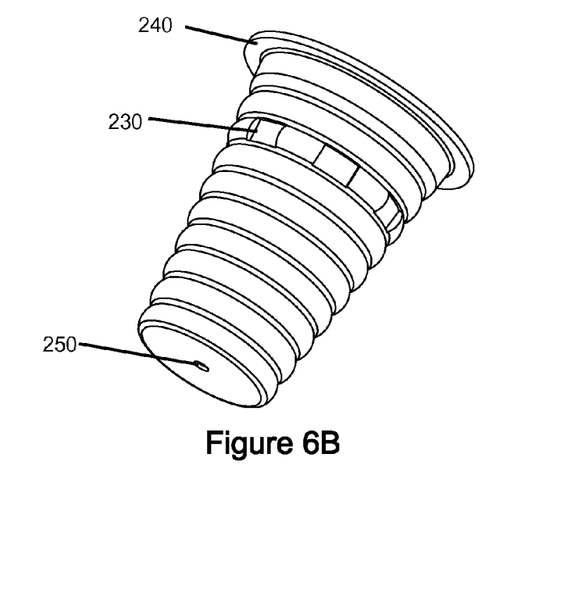
FIG. 6B shows a bottom perspective view of the intermediate layer cup of FIG. 5.
Figure 6C:
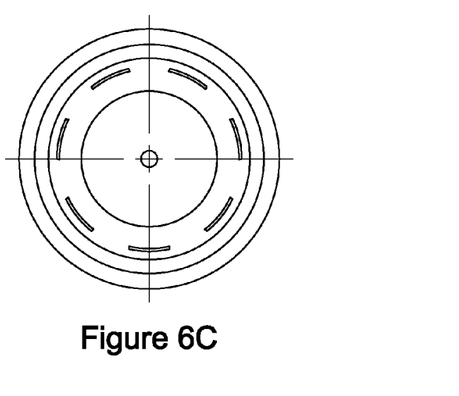
FIG. 6C shows a top view of the intermediate layer cup of FIG. 5.
Figure 6D:
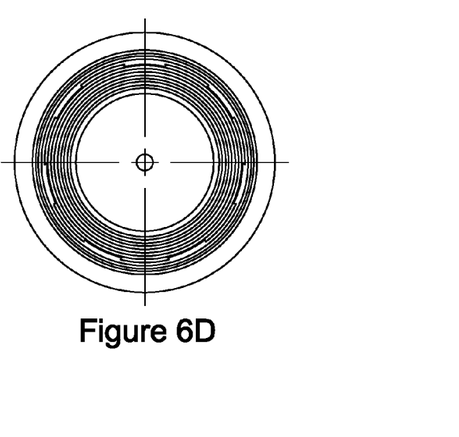
FIG. 6D shows a bottom view of the intermediate layer cup of FIG. 5.
Figure 6E:
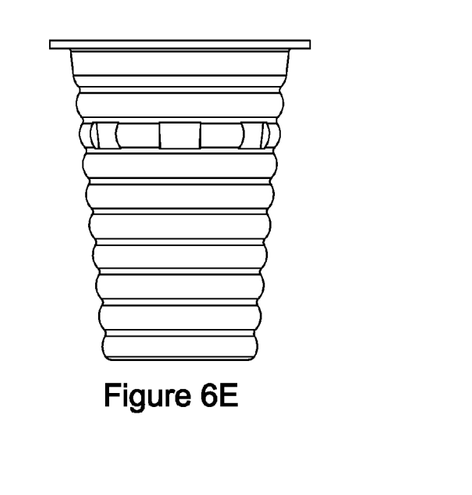
FIG. 6E shows a side view of the intermediate layer cup of FIG. 5.

FIG. 6A shows another perspective view of the intermediate layer cup of FIG. 5. FIG. 6B shows a bottom perspective view of the intermediate layer cup of FIG. 5. FIG. 6C shows a top view of the intermediate layer cup of FIG. 5. FIG. 6D shows a bottom view of the intermediate layer cup of FIG. 5. FIG. 6E shows a side view of the intermediate layer cup of FIG. 5. In these figures, one can see the bottom portal 250—in this embodiment, a single portal at the center/midpoint of the bottom circular plane of the intermediate cup 200. The portions 230 are nearest to the top side of the cup 200, the top side comprising the lip 240. The lip 240 abuts, when placed together in use, lips of both the inner cup 100 and outer cup 300, the difference in heights between each two portions of the lips 240 and 245 being visible in FIG. 6A. When liquid enters into the cup 100, it flows out of the portals 130, filling the central cavity of the intermediate cup 200, and exiting out the lower portal 250 or overflowing out of the upper portals 230. As such, this allows the liquid to steadily flow through the particulate solid matter in the cup 100, and be homogenized and [percolate as it mixes and flows through the intermediate basket, and then into the outer layer cup 300, as shown in FIG. 7.

Figure 7:
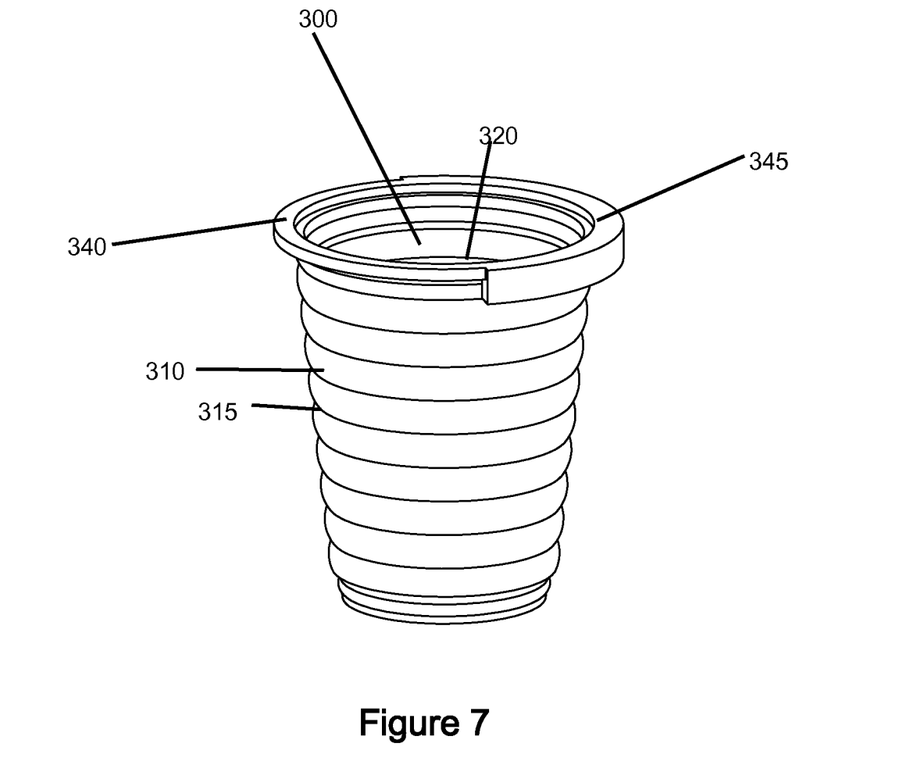
FIG. 7 shows a perspective view of an outer layer cup of an embodiment of the disclosed technology.

FIG. 7 shows a perspective view of an outer layer cup of an embodiment of the disclosed technology. The outer layer cup 300, in an embodiment of the disclosed technology has ridges 315 on the outer surface 310. Ridges are defined as irregular surfaces which have a common interior extent, and common exterior extent different from the interior extent, which are alternately exposed. Here, the ridges 315 are on both the inner and outer sides of the cup 300, and interface (line up with) ridges 215 on the outer side 210 of the intermediate cup 200.

Referring still to FIG. 7, the outer layer cup 300 has an interior side 320 (with ridges 315) and two-portioned lip 340 and 345. A portion of the lip 340 extends less far from the cylindrical (defined as a portion having circular cross sections) cavity spaced between the interior side 320, than another portion of the lip 345. The aforementioned lips are referred to as a "smaller lip 340" and "larger lip 345," the difference in size between the smaller and larger lips made up for by a lid 500 positioned there-on, as will be described below. Each larger and smaller lip extends 50% of the way around the circular circumference, in an embodiment of the disclosed technology. In other embodiments, the larger or smaller lip may extend 55%, 60%, 65%, or 75% all around, with a corresponding opposite lip of the lid 500 slidably accounting for the rest of the circumference, to complete a size of the larger lip around the entire circumference of the two abutted devices, the outer cup layer 300 and lid 500.

Figure 8A:
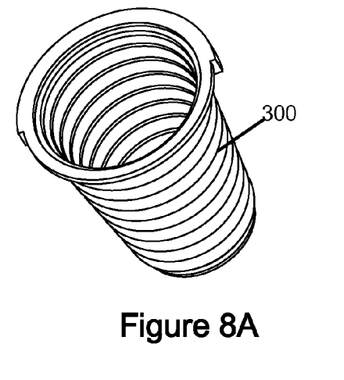
FIG. 8A shows a top perspective view of the outer layer cup of FIG. 7.
Figure 8B:
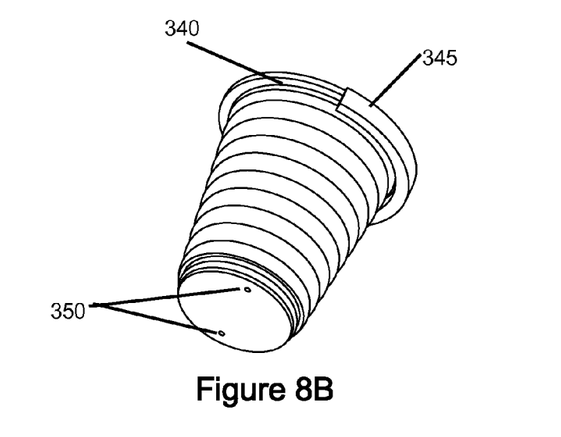
FIG. 8B shows a bottom perspective view of the outer layer cup of FIG. 7.
Figure 8C:
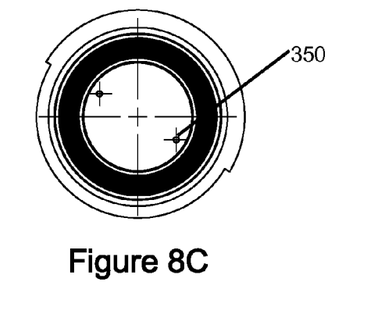
FIG. 8C shows a bottom plan view of the outer layer cup of FIG. 7.
Figure 8D:
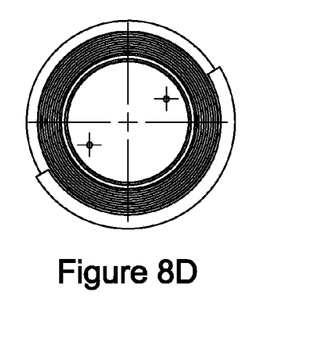
FIG. 8D shows a top plan view of the outer layer cup of FIG. 7.
Figure 8E:
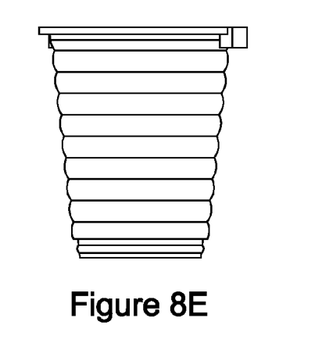
FIG. 8E shows a side view of the outer layer cup of FIG. 7.

More views of the outer layer cup 300 are shown as follows. FIG. 8A shows a top perspective view of the outer layer cup of FIG. 7. FIG. 8B shows a bottom perspective view of the outer layer cup of FIG. 7. FIG. 8C shows a bottom plan view of the outer layer cup of FIG. 7. FIG. 8D shows a top plan view of the outer layer cup of FIG. 7. FIG. 8E shows a side view of the outer layer cup of FIG. 7. One can see in FIG. 8, the ridges on the outside and inside of the walls of the cup, the walls extending from the circular base to the lip. One can also see the bottom portals 350, here, shown as two spaced-apart portals where the liquid, after passing through the particulate solid matter in the inner cup, through the intermediate cup, and into the cavity of the outer cup 300. From the bottom portal or portals 350, the liquid, with dissolved particulate solid matter (which is no longer solid) exits into the nozzle 400 or directly into another destination, such as a separate cup from which one drinks.

Figure 9:
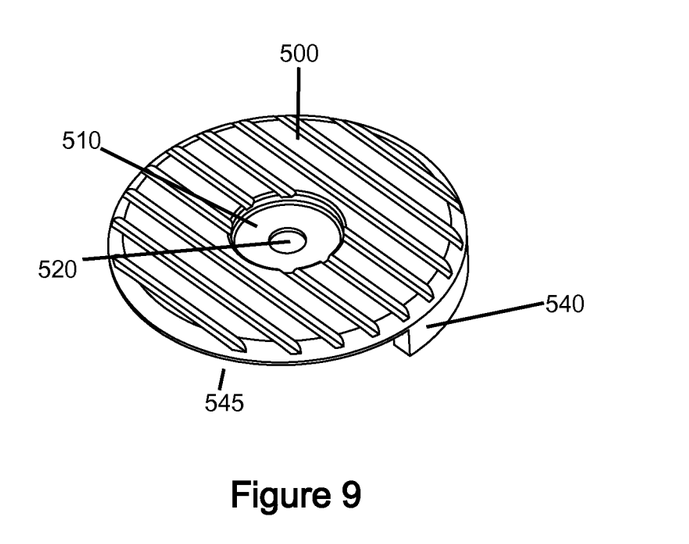
FIG. 9 shows a top perspective view of a lid of an embodiment of the disclosed technology.

FIG. 9 shows a top perspective view of a lid of an embodiment of the disclosed technology. The lid 500, as described partially above, has a top side which may have ridges or grooves, as shown, which aid in gripping by an external device or machine adapted for grasping this lid, subject to another patent application being filed with this application, and hereby incorporated by reference. The lid had a depression 510 around a portal 520. The portal 510, in embodiments of the disclosed technology, extends outward from the midpoint to the outer extent of a circular cross section of the lid, with the depression 520 beginning at the outer extent (side furthest away from the midpoint) of the portal towards the outer extent of the circular cross section of the lid. The depression allows for alignment of a liquid expelling head of another device, with nozzle lined up with the portal 520. The lip 540 extends partially around the circumference of the lid 500, leaving a void 545 created in an imaginary space where the lip would extend if its circumferential path continued around the lower side of the body of the lid 500, the body being defined as the portion above the plane of the flange of the lip 540.

Figure 10A:
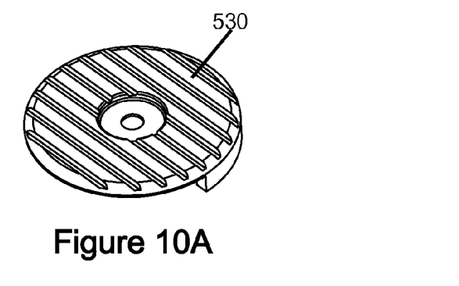
FIG. 10A shows another perspective view of the lid of FIG. 9.
Figure 10B:
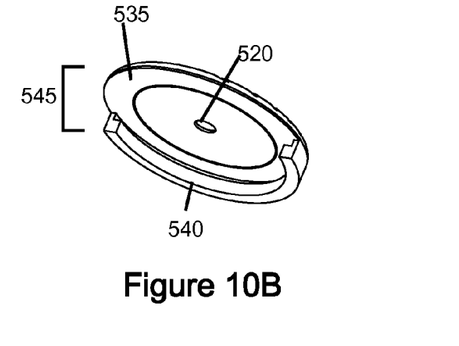
FIG. 10B shows a bottom perspective view of the lid of FIG. 9.
Figure 10C:
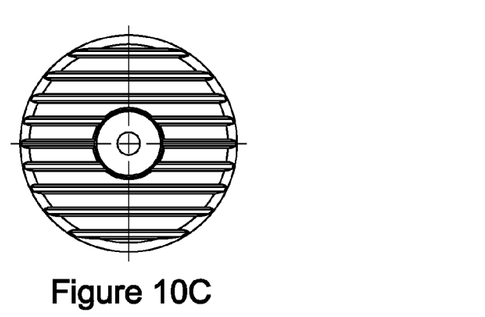
FIG. 10C shows a top plan view of the lid of FIG. 9.
Figure 10D:
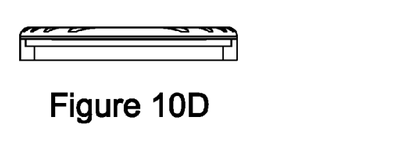
FIG. 10D shows a side view of the lid of FIG. 9.
Figure 10E:
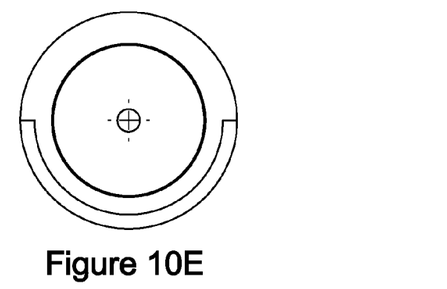
FIG. 10E shows a bottom view of the lid of FIG. 9.

FIG. 10A shows another perspective view of the lid of FIG. 9. FIG. 10B shows a bottom perspective view of the lid of FIG. 9. FIG. 10C shows a top plan view of the lid of FIG. 9. FIG. 10D shows a side view of the lid of FIG. 9. FIG. 10E shows a bottom view of the lid of FIG. 9. Here, one can see the lip 540 extending circumferentially and partially around the lower side of the body of the lid 500, where the portal 520 encompasses a midpoint of the circular region, with the lip 540 forming a partial-circumference around an imaginary line passing directly through the center of the portal.

Figure 11:
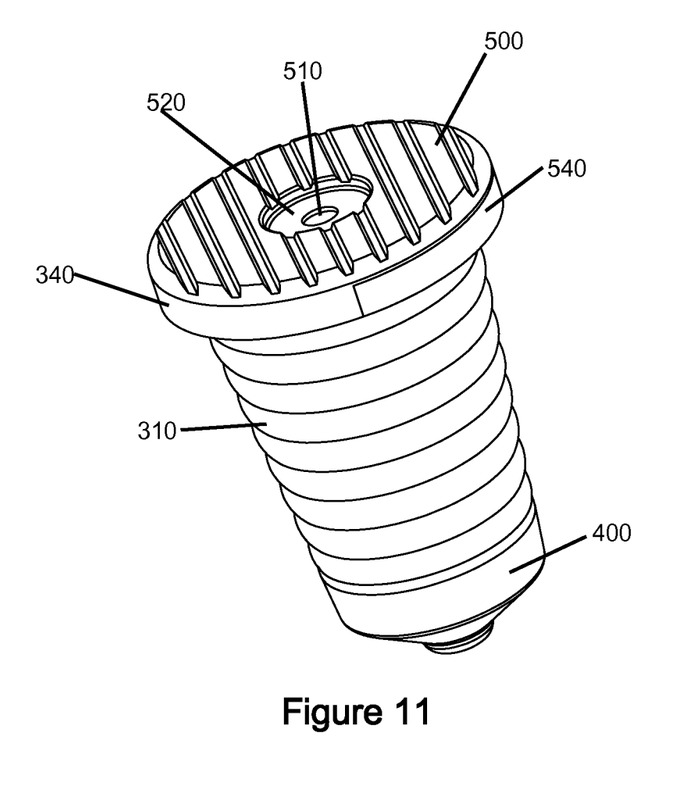
FIG. 11 shows a perspective view of the fully assembled brew cup of an embodiment of the disclosed technology.

FIG. 11 shows a perspective view of the fully assembled brew cup of an embodiment of the disclosed technology. When fully assembled, referring also again to FIG. 2E, the particulate solid matter rests in, or abuts the inner cavity of the inner layer cup 100, the walls of the inner layer cup 10 being mostly or fully surrounded by the walls of the intermediate layer cup 200, these walls being mostly or completely surrounded by the walls of the outer layer cup 300, having an outer ridged side 310, as shown in FIG. 11. The lip 340 and lip 540, which form a unitary structure with outer layer cup 300 and lid 500, respectively, abut each other in a manner such that two end points of each lip abut each other when the brewing cup is fully assembled, as shown. The reverse side is the same as the side shown. The abutting portions of the lips are the narrow, flat regions between each curved side of each lip. The lid 500 is slid horizontally (across the plane of the top of and) onto the outer layer cup 300 until lip 540 abuts lip 340. In embodiments of the disclosed technology, the lip 540 of the lid interlocks with the top of the cup 300, 200, or 100, such that it is removable only by way of sliding it horizontally, with respect to the top of the respective cup or cups.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

I claim:

1. A multi-chamber cup, comprising:

an inner cup, an intermediate cup, and an outer cup, each having sides with circular cross-sections between a top side and bottom side, defining an inner cavity therebetween, each with a lip at a top side of said cup, extending outwards from a respective said inner cavity;

said lip of said intermediate cup having a stepped bifurcation between an inner portion of said lip closer to said cavity of said intermediate cup, and an outer portion of said lip further from said cavity of said intermediate cup;

said inner cup adapted to fit within said cavity of said intermediate cup such that a bottom side of said lip of said inner cup abuts a top side of said inner portion of said lip of said intermediate cup;

said intermediate cup adapted to fit within said cavity of said outer cup such that a bottom side of said outer portion of said lip of said intermediate cup abuts a top side of said lip of said outer cup;

wherein said lip of said outer cup comprises two portions, a first portion of said lip of said outer cup being wider and/or extending further down towards a bottom side of said outer cup than a second portion, and further comprising a lid with a partial-circumferential lower lip.

2. The multi-chamber cup of claim 1 wherein said lip of said outer cup comprises two portions, a first portion of said lip extending about a first portion of said circular cross section of said outer cup being wider and/or extending further down towards a bottom side of said outer cup than a second portion of said lip extending about a second portion of said circular cross section of said outer cup.

3. The multi-chamber cup of claim 1, wherein said partial-circumferential lip corresponds to said second portion of said lip of said outer cup.

4. The multi-chamber cup of claim 3, wherein said first portion of said lip of said outer cup and said partial-circumferential lower lip of said lid form a complete circumferential lip.

5. The multi-chamber cup of claim 4, wherein said lid has a bottom and top generally circular shape, and further comprises a portal at a midpoint of said circular shape.

6. The multi-chamber cup of claim 5, wherein said inner cup comprises portals on said circular sides, closer to said bottom side.

7. The multi-chamber cup of claim 6, wherein said intermediate cup comprises portals on said side closer to said top side, and a bottom portal on a bottom side of said cup.

8. The multi-chamber cup of claim 7, wherein said intermediate cup and said outer cup further comprise bottom portals.

9. The multi-chamber cup of claim 8, wherein said multi-chamber cup, in a stacked configuration with said inner cup in said intermediate cup and said intermediate cup in said outer cup, is adapted to house solid particulate matter in said inner cup, and forces liquid entering through said portal of said lid to flow through each said cup before exiting out of a bottom of said outer cup.

* * * * *